United States Patent
Carabelli et al.

(10) Patent No.: US 10,672,569 B2
(45) Date of Patent: Jun. 2, 2020

(54) SECURED KEYPAD FOR AN ELECTRONIC DATA-ENTRY DEVICE

(71) Applicant: INGENICO GROUP, Paris (FR)

(72) Inventors: Andre Carabelli, Saint-Peray (FR); Stephane Pavageau, Le Roche de Glun (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 0 days.

(21) Appl. No.: 15/928,631

(22) Filed: Mar. 22, 2018

(65) Prior Publication Data
US 2018/0277319 A1    Sep. 27, 2018

(30) Foreign Application Priority Data
Mar. 22, 2017 (FR) ...................... 17 52381

(51) Int. Cl.
*H01H 13/70* (2006.01)
*G06F 21/86* (2013.01)
(Continued)

(52) U.S. Cl.
CPC .......... *H01H 13/70* (2013.01); *G06F 3/0219* (2013.01); *G06F 21/83* (2013.01); *G06F 21/86* (2013.01);
(Continued)

(58) Field of Classification Search
CPC ...... G06F 3/044; G06F 3/04886; G06F 3/041; G06F 3/03547; H01H 13/14; H01H 13/52;
(Continued)

(56) References Cited

U.S. PATENT DOCUMENTS 3,911,234 A * 10/1975 Kotaka ................ G06F 15/02
200/5 A
8,367,958 B2   2/2013 Mittleman et al.
(Continued)

OTHER PUBLICATIONS

French Search Report dated Sep. 20, 2017 for corresponding French Application No. 1752381, filed Mar. 22, 2017.
(Continued)

*Primary Examiner* — Ahmed M Saeed
(74) *Attorney, Agent, or Firm* — David D. Brush; Westman, Champlin & Koehler, P.A.

(57) ABSTRACT

A keypad for an electronic data-entry device. The keypad includes: a plurality of keys defining a layer of keys; a connection printed-circuit board having a key-press detection portion having an external face oriented towards the layer of keys and an internal face opposite the external face; for each key of the layer of keys, an interconnection element and at least one pair of contacts on the connection printed-circuit board, the interconnection element being intended for making the electrical connection of the contacts of the pair of contacts when the associated key is pressed. The connection printed-circuit board is a flexible printed-circuit board further including a connecting portion forming a fold beneath the internal face of the key-press detection portion, and the pair of contacts is disposed on the internal face.

8 Claims, 2 Drawing Sheets

Figure 1A:
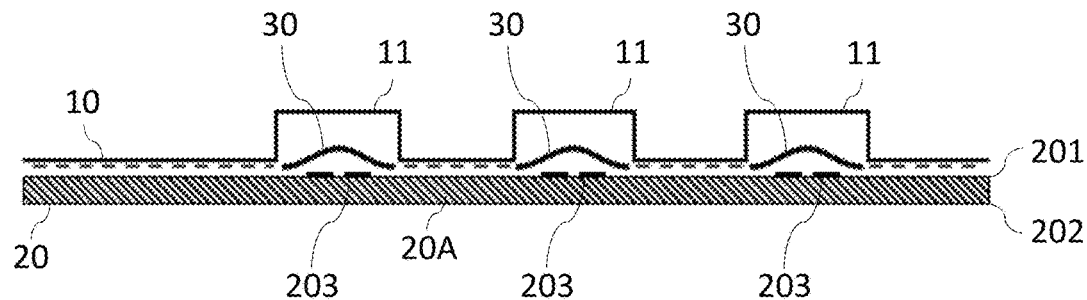

(51) Int. Cl.
*G06F 21/83* (2013.01)
*G06F 3/02* (2006.01)
*H01H 13/04* (2006.01)
*H01H 13/10* (2006.01)
*H01H 13/14* (2006.01)

(52) U.S. Cl.
CPC ............ *H01H 13/04* (2013.01); *H01H 13/10* (2013.01); *H01H 13/14* (2013.01); *H01H 2233/002* (2013.01); *H01H 2233/07* (2013.01)

(58) Field of Classification Search
CPC .................. H01H 13/48; H01H 13/704; H01H 2221/044; H01H 2215/004; H01H 3/12; H01H 2203/038
USPC ........ 200/406, 516, 341, 512, 292, 513, 520, 200/14, 314, 600; 345/173–175
See application file for complete search history.

(56) References Cited

U.S. PATENT DOCUMENTS

| | | |
|---|---|---|
| 2001/0048379 A1 | 12/2001 | Kaikuranta et al. |
| 2007/0151838 A1* | 7/2007 | Lundell .............. H01H 13/7006 200/512 |
| 2010/0102127 A1 | 4/2010 | Bonnet et al. |
| 2013/0306450 A1 | 11/2013 | Wolfe et al. |
| 2014/0091930 A1 | 4/2014 | Mirkazemi-Moud et al. |

OTHER PUBLICATIONS

English translation of the French Written Opinion dated Sep. 20, 2017 for corresponding French Application No. 1752381, filed Mar. 22, 2017.

* cited by examiner

SECURED KEYPAD FOR AN ELECTRONIC DATA-ENTRY DEVICE

This Application claims priority to and the benefit of French Patent Application No. 1752381, filed Mar. 22, 2017, the content of which is incorporated herein by reference in its entirety.

FIELD OF THE INVENTION

The field of the invention is that of keyboards or keypads for electronic data-entry devices. More particularly, the invention relates to keypads enabling the entry of sensitive data into electronic devices used to carry out operations that bring into play or relate to confidential objects. This is the case for example with a payment terminal, the keypad of which is used especially to enter a confidential code associated with a payment card.

PRIOR ART

An electronic data-entry device most frequently comprises a screen used to display the graphic interface of a current application executed within the device, and a keypad enabling a user to interact with said application. The keypad traditionally comprises a set of keys that are generally associated with one or more alphanumeric characters or punctuation characters or again one or more pictograms. By pressing these keys in succession, a user can form and then validate a sequence of data representing a piece of information to be given to the electronic data-entry device to carry out a processing operation. For example, the keys of the keypad of a payment terminal can be used to enter the amount of a financial transaction, or again a confidential code associated with a payment card. To this end, there are numerous types of keypads. There are, for example, physical keypads and virtual keypads (displayed on touchscreens, for example for smartphones or payment terminals with touchscreens). Not all the electronic data-entry devices however are provided with a touchscreen, and there are many situations in which the use of a physical keypad continues to be the most appropriate solution, for example in order to control the production costs of the data-entry device (a touchscreen is costly) or again because a physical keypad offers natural tactile feedback to the user (who can literally touch and feel the keys and the pressure beneath his fingers, an effect more difficult to obtain with a virtual keypad). A physical keypad also offers the possibility of adding embossed features to the keys, making it usable by blind individuals. Physical keypads therefore preserve all their utility. A physical keypad is often integrated into the casing of the electronic data-entry device, especially when this device is a portable device.

FIG. 1a describes an example of a structure of a prior-art physical keypad in a simplified view that represents its main elements. Such a keypad comprises at least one key and generally several keys 11. These keys 11 can take the form of parts that are independent of one another or again can be formed in one and the same keypad membrane or key mat. In both cases, they are generally disposed substantially in a same plane (the keypad plane), thus defining a layer 10 of keys. A connection printed-circuit board 20 is placed beneath the layer 10 of keys. This connection printed-circuit board 20 enables the electrical connection of the keypad to other components of the electronic data-entry device. The connection printed-circuit board 20 comprises especially a 'key-pressure' or 'key-press' detection portion 20A having an external face 201 oriented towards the layer of keys 10 and an internal face 202 opposite said external face 201 (throughout the document, the term "key-press" is used to designate the fact that at least one key of the keypad is being pressed by the user). For each key 11 of the keypad, at least one pair of contacts 203 is disposed on the external face 201 of the connection printed-circuit board 20. Each key 11 is also associated with an interconnection element 30 to provide for the electrical interconnection of the contacts 203 of the pair of contacts associated with the key considered, when pressure is exerted on this key. The interconnection element 30 is therefore placed between the key and the associated pair of contacts. When a key 11 is in its resting or idle state, i.e. when it is not depressed, the contacts 203 of the pair of contacts associated with the key are not electrically connected. When the key is pressed, under the effect of the user's finger for example, the pressure force is transmitted from the key 11 to the interconnection element 30, and prompts a change in the state of this interconnection element 30. This change in state, which can take the form of a shift and/or a deformation (i.e. a change of shape) of the interconnection element 30, leads to the electrical interconnection of the different contacts of the pair of contacts 203, prompting the detection, at the connection printed circuit 20, of the pressing of the key. As compared with a simple shifting of the interconnection element 30, a deformation is valuable in that it enables the user to be given a more marked tactile feedback. A known, simple and low-cost means of implementing such a deformation lies in the use of interconnection elements 30 that take the form of deformable domes. When the pressure exerted on the peak of the dome goes beyond a certain degree, the dome undergoes sudden transformation in getting crushed and the user immediately feels that his pressing of the key has truly been taken into account. More specifically, the peak of the dome gets compressed towards its base until a metalized part situated inside the dome, beneath its peak, comes into contact with the pair of contacts 203 and prompts the electrical interconnection of these contacts. The different domes associated with the keys of the keypad can be independent of one another. They can also be connected to one another in being assembled in the form of a sheet of domes (represented in dashes in the figures). Such a sheet of domes is generally a sheet formed out of a material having electrical insulator properties and on which the domes are bonded using a dual-face adhesive. The use of a sheet of domes especially provides for accurate positioning of the domes relative to the keys of the keypad. In order to obtain a counter-pressing action relative to the pressure exerted on the key 11 (and transmitted to the associated interconnection element 30), the connection printed-circuit board 20 is, at least in its key-press detection portion 20A, a rigid printed-circuit board that rests for example on an epoxy type support. The connection printed-circuit board 20 can take the form of a rigid printed-circuit board, proper and specific to the keypad, which is for example connected to the motherboard of the electronic data-entry device. As an alternative, the motherboard of the electronic data-entry device can itself, among other functions, act as a connection printed-circuit board 20: the pairs of contacts 203 and the electrical tracks needed to implement the keypad are then directly integrated into the motherboard of the electronic data-entry device.

One drawback of a keypad as described with reference to FIG. 1a is that it is not secured: indeed, it is relatively easy for a malicious individual to access the signals for detecting key-pressing actions, for example by introducing probes at the contacts 203 or at the electrical tracks present on the connection printed-circuit board 20. This poses a problem of security, especially when such a keypad is used to enter sensitive data. When there are no protective mechanisms, a malicious person can thus succeed in recovering confidential information entered by a user on the keypad (the confidential code associated with a bankcard for example).

The American patent application published under number US 2014/0091930 describes, on one of its aspects, a solution to reinforce the securing of a keypad of this type. This approach is presented in a simplified and schematic manner with reference to FIGS. 1b and 1c.

Figure 1B:
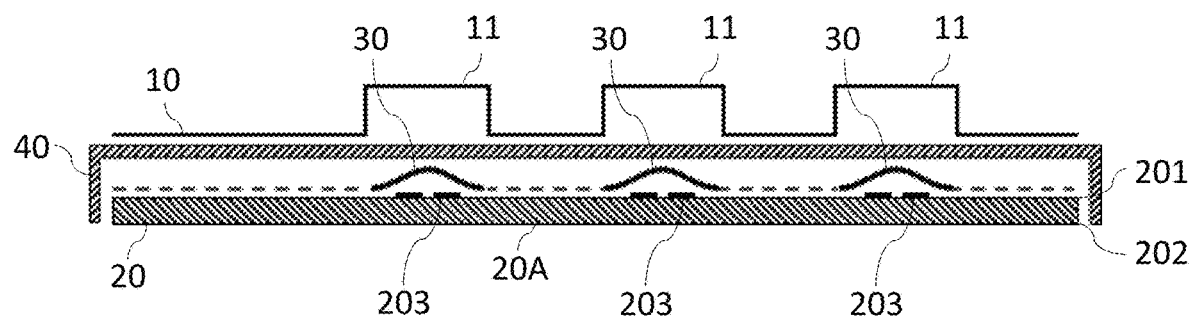
Figure 1C:
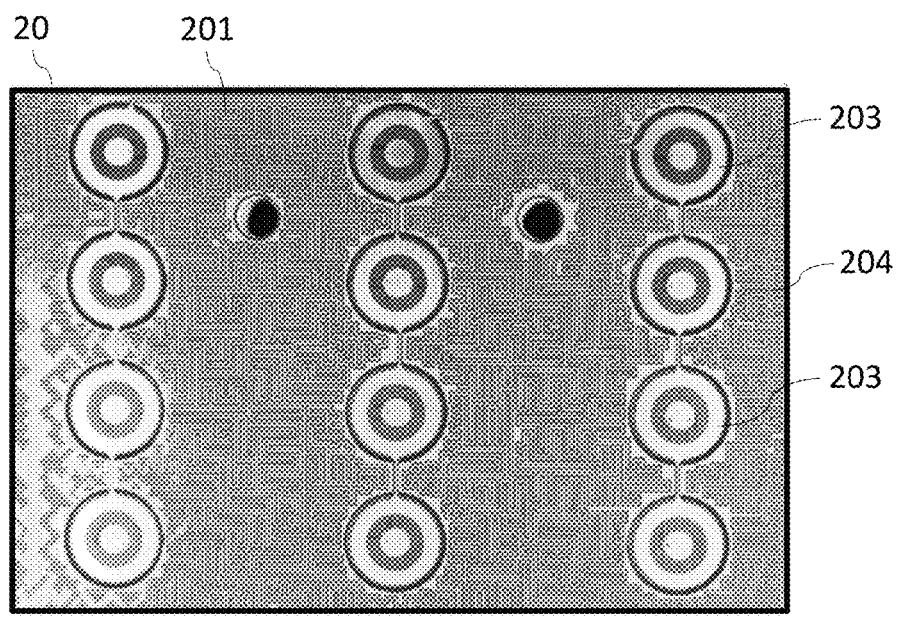

FIG. 1b represents a keypad in a view similar to that of FIG. 1a. The connection printed-circuit board 20 of FIG. 1b is also seen in a top view in FIG. 1c. This connection printed-circuit board 20 is a rigid printed-circuit board that comprises, on its external face 201, pairs of contacts 203 (twelve pairs of contacts in the example of FIG. 1c), each being associated with a key 11 of the keypad. In order to reinforce the securing of the keypad, and as shown in FIG. 1c, the connection printed-circuit board 20 also comprises one or more intrusion-detecting grid elements 204 that extend on a major part of its external face 201, around pairs of contacts 203, or even beneath these pairs of contacts 203. The intrusion-detecting grid elements 204 contribute to reinforcing the securing of the electronic data-entry device: they make it possible for example to detect an attempt at intrusion seeking, for example by drilling, to access electrical tracks that are situated for example on the internal face 202 of the connection printed-circuit board 20 (such as the electrical tracks conveying sensitive key-press detection signals). However, these intrusion-detecting grid elements 204 offer only a partial securing of the keypad: as can be seen in FIG. 1c, the pairs of contacts 203 associated with each key of the keypad are not protected by the intrusion-detecting grid element 204. This incomplete protection is a constraint that arises out of the very structure of the keypad: the pairs of contacts must remain immediately accessible beneath the interconnection elements 30 in order to enable the detection of key-press actions when these keys are depressed. Thus, these zones in which the pairs of contacts 203 are situated constitute points of weakness of the keypad because they are not protected and therefore easily accessible to a malicious individual.

To overcome this problem, the US document 2014/0091930 discloses the possibility of adding a complementary protective printed-circuit board that takes the form of a flexible printed-circuit board 40 entirely covered by a protective grid element. This flexible printed-circuit board 40 is disposed beneath the layer 10 of keys but above the interconnection elements 30 (if the interconnection elements 30 are deformable domes, the flexible printed-circuit board 40 is for example positioned between the layer 10 of keys and the peak of the deformable domes 30). Owing to its flexible character, the printed-circuit board 40 can undergo local deformations: it therefore does not hinder the communication of the pressure force exerted on a key 11 (situated above the flexible printed circuit 40) to the corresponding interconnection element 30 (situated beneath the flexible printed circuit 40, facing the pressed key 11). This flexible printed circuit 40 can also be folded down at its sides in order to form, in conjunction with the connection printed-circuit board 20, a protective enclosure around the contact points 203. Such a solution therefore makes it possible to reinforce the securing of the keypad. It is however costly because it requires the use of a complementary protective printed-circuit board (the flexible printed-circuit board 40) that is different from the connection printed-circuit board 20 to provide efficient securing of the keypad.

There is therefore a need for a solution that offers a sufficiently complete protection for a keypad on which confidential data is likely to be entered but which is also simpler and costs less in its implementation than the prior-art solutions.

SUMMARY OF THE INVENTION

The present invention makes it possible to partly resolve the problems posed by the prior art. The present technique relates indeed to a keypad for an electronic data-entry device that comprises:

a plurality of keys defining a layer of keys;

a connection printed-circuit board for said keypad comprising a key-press detection portion, said key-press detection portion comprising an external face oriented towards said layer of keys and an internal face opposite said external face;

for each key of said layer of keys, an interconnection element and at least one pair of contacts on said connection printed-circuit board, said interconnection element being intended for making the electrical connection of the contacts of said pair of contacts when pressure is exerted on the corresponding key of said keypad.

In addition, according to the proposed technique:

the connection printed-circuit board is a flexible printed-circuit board further comprising a connecting portion forming a fold beneath the internal face of said key-press detection portion; and said at least one pair of contacts is disposed on the internal face of the key-press detection portion.

In this way, the keypad according to the invention is more secured than the conventional keypads inasmuch as the key-press detection contacts are no longer immediately accessible beneath the associated key but are disposed on the internal face of a flexible printed-circuit board. In other words, these contacts are kept situated beneath the flexible printed-circuit board which then forms a protection that counters direct access to these contacts from above the keypad. The flexible printed-circuit board also comprises a connecting portion that forms a fold beneath the internal face. Thus, the fold forms a protection that counters access to the contacts from at least one side of the keypad or even all sides in certain embodiments. Finally, the element to which the flexible printed-circuit board is connected—typically the motherboard of the electronic data-entry device—naturally forms a complementary protection that counters access to the contacts of the keys from beneath the keypad. In this way, the flexible printed-circuit board forms, for example with the motherboard to which it is connected, a protective enclosure that completely encloses—and therefore protects—the sensitive zones of the keypad where pieces of confidential data are likely to travel.

In one particular embodiment, the flexible printed-circuit board comprises at least one protective element that extends substantially throughout the surface of said external face and/or throughout the surface of at least one layer of said flexible printed-circuit board positioned between said internal face and said external face.

In this way, the securing of the keypad is further increased without its being necessary to resort to a specific complementary protective printed-circuit board (as is the case for example in the prior-art solution illustrated with reference to FIG. 1b already described, in which the use of a complementary protective printed-circuit board 40 proves to be necessary). Indeed, the flexible printed-circuit board of the proposed technique is a multi-layered printed-circuit board, at least a dual-face board, the internal face of which is used to implement the key-press detection circuit and possibly other complementary circuits, and the external face of which, and/or at least one layer buried in the flexible printed-circuit board, is totally covered by these protective elements. Thus, the proposed solution does away with the use of a specific complementary protective printed-circuit board, thus enabling the implementing of a keypad having a more compact structure while at the same time reducing costs, without in any way reducing the level of security.

In one particular embodiment, said interconnection element takes the form of a deformable dome disposed between said internal face of the key-press detection portion and a counter-pressure element, the base of said deformable dome being oriented towards said internal face.

Thus, a well-known interconnection element—in this case a low-cost, commercially available deformable dome—is ingeniously positioned in an inverted position relative to the classic prior-art solution. Compared with the classic assembly (i.e. non-inverted assembly) of the domes described in the prior-art solutions, the inverted assembly according to the proposed technique provides enhanced mechanical strength to the keys of the keypad, increased stability to the keypad as a whole and a better tactile effect for the user when he presses a key.

According to one particular characteristic of this embodiment, the deformable domes are shaped and sized so that an action of pressing a key of the keypad leads to local deformation of the flexible printed-circuit board on a relatively large-sized surface area, for example with a size of the order of four millimeters by four millimeters.

Thus, the flexible printed-circuit board undergoes relatively little stress from the deformation undergone through an action of pressing a key because the deformable domes and the keys are shaped and sized so that a relatively large surface area of the flexible printed-circuit board is pressed. The result of this is that the protective elements that may be integrated into the flexible printed-circuit board are also less stressed during the deformation of the flexible printed-circuit board. In this way, the wear and tear of the protective elements, especially when they take the form of protective grid elements, is limited as compared with the prior-art solutions. The risks of inaccurate and untimely detections of intrusion, which would result from the premature deterioration of the protective grid elements even when the keypad is being put through quite normal use, are therefore reduced.

In one particular embodiment of the proposed technique, the counter-pressure element takes the form of a protective cover to protect an element of the electronic data-entry device.

In this way, an element of the keypad is exploited ingeniously to act both as a counter-pressure element and as a protective device for another sensitive element of the electronic data-entry device such as a memory card reader for example. Such a protective cover can be a metal cover or a plastic cover or even a cover formed by another rigid printed-circuit board.

In another particular embodiment, the counter-pressure element is the motherboard of the electronic data-entry device.

Such a configuration, combined with the fact that the domes are inverted, releases space on the motherboard as compared with the prior-art solutions. Indeed, the motherboard then acts simply as a mechanical counter-pressure element and there is no longer any need to integrate therein the pairs of contacts associated with the keys of the keypad, and this releases space. Besides, the surfaces of the motherboard reserved to act as counter-pressure zones are smaller than in the prior-art solutions inasmuch as it is now the peaks of the domes—hence their narrowest part—and no longer their base that presses on the motherboard, giving rise to even greater gain in space.

In yet another particular embodiment, the counter-pressure element takes the form of a spacing element that takes support, through substantially point-like or line-like links, on the motherboard of the electronic data-entry device.

Such a configuration releases even more space on the motherboard while preserving a relatively compact keypad structure. In particular, the point-like or line-like links established between the spacing element and the motherboard are shaped and sized so as to take less space than links that would be set up directly through the peaks of the deformable domes.

According to another aspect, the proposed technique also relates to an electronic data-entry device that comprises a keypad as described here above. Such an electronic data-entry device can especially take the form of an electronic payment terminal.

The different embodiments mentioned here above can be combined with each other to implement the invention.

FIGURES

Figure 2:
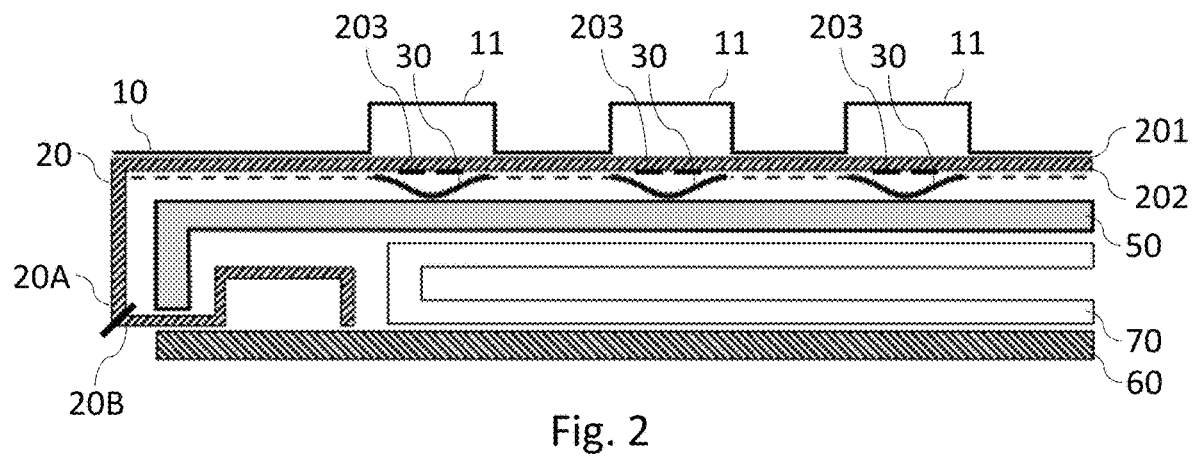
Figure 3:
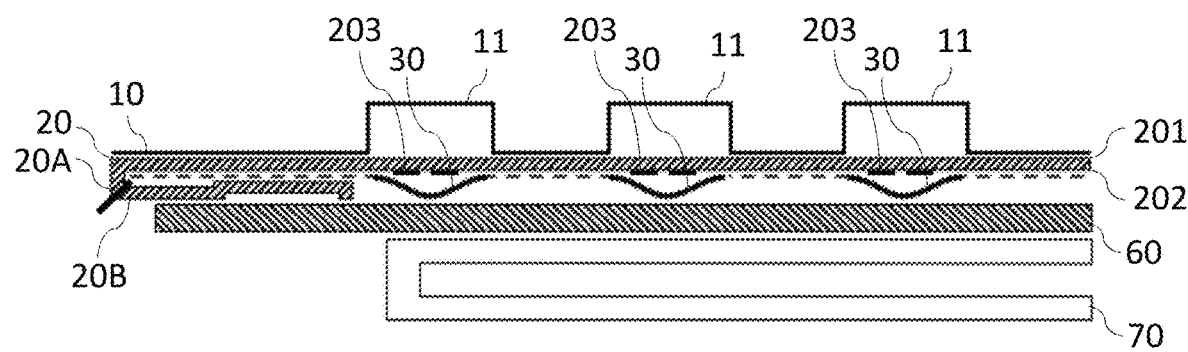
Figure 4:
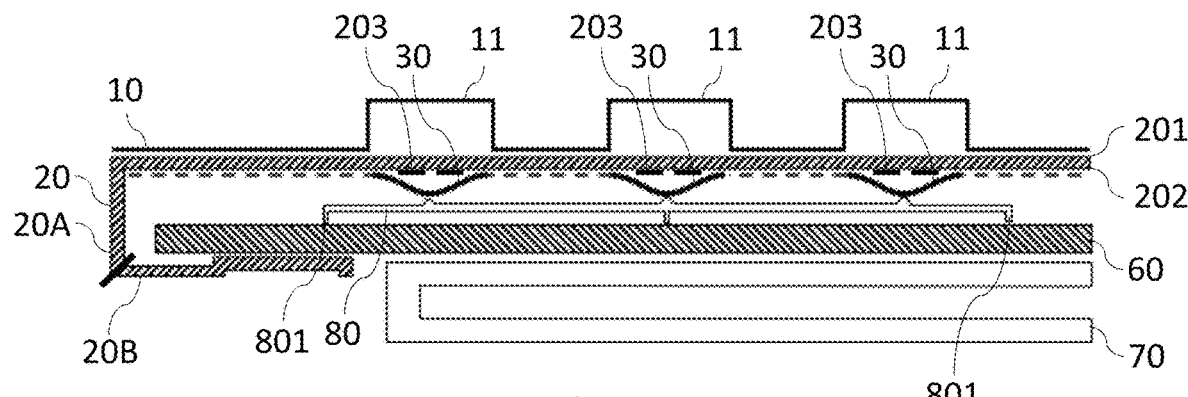

Other features and advantages of the invention shall appear more clearly from the following description of a preferred embodiment, given by way of a simple illustratory and non-exhaustive example, and from the appended drawings, of which:

FIG. 1a, already described with reference to the prior art, is a simplified schematic view of an example of a classic structure of a physical keypad;

FIG. 1b, already described with FIG. 1a but integrating protective means;

FIG. 1c, already described with reference to the prior art, shows a top view of a connection printed-circuit board of a prior-art keypad such as that of FIG. 1b, with its protective grid element;

FIG. 2 presents a simplified schematic view of a keypad structure in a first particular embodiment of the invention;

FIG. 3 presents a simplified schematic view of a keypad structure in a second particular embodiment of the invention;

FIG. 4 is a simplified schematic view of a keypad structure in a third particular embodiment of the invention.

DETAILED DESCRIPTION

General Principle

The general principle of a keypad according to the proposed technique is presented with reference to FIG. 2. It must be noted however that this general principle could equally well be presented with reference to FIG. 3 or 4. FIGS. 2, 3 and 4 illustrate different embodiments of a keypad, the securing of which relies on one and the same general principle. Throughout the description, elements of a same nature are identified by a same numerical reference in the figures.

The keypad according to the proposed technique has many structural characteristics in common with prior-art keypads such as those described already with reference to FIGS. 1a and 1b. Just like the prior-art keypads, the keypad according to the invention comprises at least one key 11, generally several keys 11. The keys 11 are disposed appreciably in one and the same plane, thus defining a layer 10 of keys. These keys 11 are, as the case may be, linked to one another within a same key membrane but they can also be independent of one another. A connection printed-circuit board 20 comprising a key-press detection portion 20A is also positioned beneath the layer 10 of keys. The key-press detection portion 20A has an external face 201, oriented in its major part towards the layer 10 of keys and an internal face 202 opposite said external face 201. The connection printed-circuit board 20 comprises, within its key-press detection portion 20A, at least one pair of contacts 203 (in other words, a plurality of contacts) associated with at least one key 11 of the keypad. For each key 11 of the keypad, there is also an interconnection element 30 to provide the electrical interconnection of the contacts of the associated pair of contacts 203 when this key is pressed.

The keypad of the proposed technique can be distinguished however from prior-art keypads in at least two main characteristics:

on the one hand the connection printed-circuit board 20 is a flexible (and no longer rigid) printed-circuit board that comprises, in addition to the key-press detection portion 20A, a connecting portion 20B forming a fold beneath the internal face 202 of said key-press detection portion 20A;

on the other hand, the pairs of contacts 203 associated with the different keys of the keypad are disposed on the internal face 202 of the key-press detection portion 20A and no longer on its external face 201 as is the case with the prior-art solutions.

These characteristics are complementary and together make it possible to propose a keypad offering advantages as compared with the prior-art keypads, especially in terms of securing. Indeed, with the proposed technique and as can be seen especially in FIG. 2 (as well as in FIGS. 3 and 4), the pairs of contacts 203 are no longer immediately accessible beneath the layer 10 of keys since they are now disposed on the internal face 202 of the key-press detection portion 20A of the connection printed-circuit board 20. These pairs of contacts 203 are therefore by nature less exposed than the pairs of contacts of the prior-art solutions since they are now situated beneath the connection printed-circuit board 20: this printed-circuit board therefore constitutes an additional obstacle to be crossed for a malicious individual who might wish to access the pairs of contacts 203.

Such a keypad architecture is made possible by the use of a connection printed-circuit board 20 taking the form of a flexible printed-circuit board. The connection printed-circuit board 20 can therefore undergo local deformation, through which the pressure force exerted on a key 11 of the keypad can be communicated to the corresponding interconnection element 30 now situated beneath the connection printed-circuit board 20.

The fact that the connection printed-circuit board 20 is flexible also makes it possible to implement a fold of the connecting portion 20B beneath the key-press detection portion 20A (in FIGS. 2 to 4, a fictitious boundary between the key-press detection portion 20A and the connecting portion 20B of the connection printed-circuit board 20 is represented in a purely illustrative and non-exhaustive manner by a thick oblique line, it being understood especially that the position of this line within the junction zone between these two portions is purely arbitrary in the figures). In this way, the pairs of contacts 203 and the electrical tracks are also protected by the sides (through the fold) and from beneath (for example through the printed-circuit board 60—typically the motherboard of the electronic data-entry device—to which the connection printed-circuit board is connected by its connecting portion 20B, it being understood that the printed-circuit board 60 is not obligatory and could be replaced by any other connection element of the connection printed-circuit board 20). In FIGS. 2 to 4, the fold of the connecting portion 20B beneath the key-press detection portion 20A is illustrated only for one side of the keypad, especially in order to simplify the figures and make them easier to read. It goes without saying that such a representation is purely illustratory and non-exhaustive, depending on the situation in which the keypad is implemented and according to certain embodiments of the proposed technique, this fold can also be made on any other side of the keypad or on several sides simultaneously. Preferably, in one particular embodiment, the fold is made on all sides of the keypad: in this way, the flexible printed-circuit board 20 forms, for example with the motherboard to which it is connected, a protective enclosure that completely—i.e. from all sides—encloses the sensitive zones of the keypad. These zones, which are those within which signals conveying potentially confidential data travel, include especially the internal face 202 on which there are positioned the pairs of contacts 203 associated with the different keys of the keypad and the interconnection elements 30.

These characteristics of the connection printed-circuit board 20 are sufficient by themselves to implement a complete and efficient securing of the keypad in a simpler way and at lower cost than in the prior-art solutions since it is not necessary to resort to a complementary protective printed-circuit board such as the printed-circuit board 40 of FIG. 1b.

Protective Element

In one particular embodiment of the proposed technique, the flexible printed-circuit board 20 comprises at least one protective element. According to one particular characteristic, this protective element or these protective elements extend substantially on at least the entire external face 201 of the key-press detection portion 20A. As an alternative or complementarily, this protective element or these protective elements extend substantially throughout the surface of at least one layer of the flexible printed-circuit board 20 positioned between the internal face 202 and the external face 201: such a layer is therefore a buried layer of the flexible printed-circuit board 20, which is advantageous in terms of securing because it is then more difficult for a malicious person, seeking to attain the sensitive areas of the keypad, to detect and circumvent this layer. A protective element for example takes the form of one or more intrusion-detecting grid elements or the form of one or more continuous tracks for intrusion detection (for example a ground circuit and two grid elements at different potentials). This protective element or these protective elements are positioned in such a way as to cover a major part of the key-press detection portion 20A of the connection printed-circuit board 20. In particular, the protective elements cover the zones of the connection printed-circuit board 20 that are facing zones of the internal face 202 in which the pairs of contacts 203 are disposed. Thus, these particularly sensitive zones are protected optimally by these protective elements. According to one particular characteristic, the protective elements can, as the case may be, extend also on at least one part of the connecting portion 20B of the flexible printed-circuit board 20 (such a characteristic proves to be particularly valuable when the connecting portion 20B is connected beneath the motherboard of the electronic data-entry device rather than above it, as is illustrated for example with reference to FIG. 4). Ideally, the protective elements are distributed on the entire connection printed-circuit board 20 so as to provide the most efficient possible securing for the keypad.

Advantageously, the flexible printed-circuit board 20 is therefore a multi-layer printed-circuit board having at least one protective layer (the external face 201 and/or at least one intermediate layer buried between the external face 201 and the internal face 202) comprising the previously described protective elements, and an internal face 202 used to receive the pairs of contacts 203, the electrical tracks and the components needed to implement the key-press detection. This particular structure of the flexible printed-circuit board 20, having at least one fold, makes it possible, with the motherboard to which it is connected, to form a protective enclosure for the sensitive zones of the keypad. It is then possible to detect any attempt at intrusion, seeking to access these zones in which signals conveying potentially confidential data are traveling. Besides, on the internal face 202 of the flexible printed-circuit board, other components of the electronic data-entry device can also be positioned in order to fulfill other functions (especially functions independent of the keypad management functions). For example, a secured processor can be soldered to this internal face 202 to carry out cryptographic processing operations associated with the operations of the electronic data-entry device. Intrusion-detecting components can also be positioned on this internal face 202 thus benefiting from the protection provided by the protective layer comprising the protective elements. The overall security of the electronic data-entry device (into which this keypad is inserted) is then greatly increased and the size of the electronic data-entry device can thus be reduced, because the connection printed-circuit board 20 of the keypad is then capable of fulfilling different functions which hitherto were distributed over several distinct printed-circuit boards.

Deformable Domes

In one particular embodiment of the keypad of the proposed technique, the interconnection elements 30 are deformable domes. They are used to set up the electrical interconnection of the different contacts of the pairs of contacts 203 associated with the keys 11, when these keys are pressed. These deformable domes, if necessary, are assembled together within one or more sheets of domes (shown in dashes in FIGS. 2 to 4). The domes 30 are disposed facing each pair of contacts 203, between the internal face 202 of the key-press detection zone 20A of the flexible printed-circuit board 20 and one counter-pressure element 50. The base of each deformable dome 30 is oriented towards the internal face 202, i.e. towards the pair of contacts 203 that is associated with it, while the peak of each dome 30 is oriented towards the counter-pressure element 50. In other words, the domes 30 are mounted in an inverted position as compared with the classic prior-art solutions: it is their bases and not their peaks that are directed towards the keys 11 of the keypad. When a key 11 is in its idle state, i.e. not depressed, the different contacts of the pair of contacts 203 associated with the key are not interconnected electrically. When the key 11 is pressed, under the effect of a finger of the user for example, the pressure force is transmitted from the key 11 to the deformable dome 30 through a local deformation of the flexible printed-circuit board 20. Under the effect of this pressure force and the reaction force of the counter-pressure element 50, the flexible printed circuit 20 and the dome 30 get deformed until the contacts of the pair of contacts 203 come into contact with the metalized interior of the peak of the dome, thus prompting their electrical interconnection. It is worth noting here, that during the deformation of the dome 30, it is the pair of contacts 203 that moves towards the peak of the dome blocked by the counter-pressure element 50, through the simultaneous local deformation of the flexible printed-circuit board 20. In other words, it is the base of the dome 30 that moves towards its peak during the deformation undergone by the dome, unlike what happens in the classic prior-art solution already described with reference to FIG. 1b, in which it is the peak of the dome that moves towards its base during the deformation of the dome. Since the base of the dome is by definition wider than its peak, the inverted mounting of the domes then gives numerous advantages as compared with the classic (non-inverted) mounting of the prior art. In particular, the fact that it is the base of the domes (and no longer the peak) that is now oriented towards the layer of keys provides better mechanical strength for the keys, resulting in increased stability for the keypad. Besides, this inverted mounting also stabilizes the domes and thus improves the tactile effect felt by the user when he presses a key. Apart from these benefits related to the stability of the keypad or the tactile effect procured for the user, the inverted mounting of the domes also limits the stresses exerted on the flexible printed-circuit board 20 when a key 11 is pressed. Indeed, with such an implementation, the deformable domes and the associated keys can be shaped and sized so as to press on a surface of a larger size than if similar domes had been mounted in a classic manner, i.e. a non-inverted manner. The deformable domes can thus be shaped and sized (both in their height and in the size of their base in particular) so that a pressure exerted on a key of the keypad leads to local deformation of the flexible printed-circuit board on a relatively large-sized surface area, for example of the order of 4 mm×4 mm. The flexible printed-circuit board is thus relatively under low stress through this local deformation. This means that the protective elements that may possibly be integrated into the flexible printed-circuit board are also less stressed during the deformation of this flexible printed-circuit board. Such a characteristic proves to be particularly worthwhile when these protective elements take the form of finely etched protective grid elements representing complex designs: on the one hand, such grid elements are indeed relatively fragile (the electrical tracks forming the protective grid elements are generally finer than the electrical tracks implemented to carry out the usual operation of the electronic data-entry device) and, on the other hand, the complexity of their designs (i.e. the shapes of the electrical tracks that form them) make these protective grid elements particularly sensitive to repeated movements caused by the deformation of the flexible printed-circuit board. The inverted mounting configuration of the domes as proposed in the present technique is then particularly appropriate inasmuch as such protective grid elements are less acted upon—when a key is pressed and the flexible printed-circuit board gets deformed—than if the domes had been mounted in the classic fashion. The wear and tear on the protective grid element is thus limited as compared with the prior-art solutions. The proposed technique therefore reduces the risks of inaccurate detection and untimely intrusion (false-positives) that would be actually due to premature deterioration of the protective grid element, even though the keypad was actually being used in an entirely normal way.

These characteristics, presented with reference to the general principle of the proposed technique, can of course be combined with each other without departing from the framework of the present invention.

DESCRIPTION OF DIFFERENT EMBODIMENTS

Referring to FIGS. 2, 3 and 4, we describe different embodiments of the invention. These different examples of implementation especially illustrate the layout of a keypad of the proposed technique within an electronic data-entry device incorporating a memory card reader 70. Here below in the description, it is considered more particularly that the electronic data-entry device is an electronic payment terminal. In all these embodiments, the interconnection element is a deformable dome mounted invertedly relative to the classic prior-art solutions, in compliance with the previously described technique. FIGS. 2, 3 and 4 present especially various embodiments to implement the counter-pressure that makes it possible to obtain the reaction force required for a dome to get deformed when the associated key of the keypad is pressed.

In the embodiment described with reference to FIG. 2, the counter-pressure element 50 takes the form of a rigid part used to support the keypad. Preferably, this part is formed out of a material offering high mechanical resistance, for example metal or plastic. As shown in FIG. 2, the counter-pressure element 50 can especially take the form of a metallic protective cover protecting at least one part of the memory card reader 70. The memory card reader 70 is indeed, like the keypad, a particularly sensitive area of the electronic data-entry device because signals conveying confidential data travel therein (especially at the level of the memory card connector present in the reader). It is therefore necessary to protect it against any attempt at intrusion. The counter-pressure element 50 then plays the dual role of a support for the keypad on the one hand and a protective cover for the memory card reader 70 on the other hand. In the embodiment presented in FIG. 2, the counter-pressure element protects the upper part and the sides of the memory card reader 70 and it rests at the same time partly on the motherboard 60 of the electronic payment terminal. This motherboard 60 can itself integrate various protective elements (such as protective grid elements for example) and thus protect the lower part of the memory card reader 70. The working of the keypad is provided by its connection to the motherboard 60 of the electronic data-entry device by means of the connecting portion 20B of the connection printed-circuit board 20. The flexible nature of the connection printed-circuit board 20, with the fold in the connecting portion 20B, enables the implementing of a connection called a "blind" connection, i.e. a connection made under the metal protective cover formed by the counter-pressure element 50. The signals conveyed within the keypad (especially the key-press detection signals) are therefore all protected equally well in the connecting portion 20B and the key-press detection portion 20A of the connection printed-circuit board 20.

In another particular embodiment presented with reference to FIG. 3, the motherboard 60 of the electronic data-entry device itself acts as a rigid support for the keyboard and as a counter-pressure element to provide the deformation of the domes when the keys 11 of the keypad are pressed. The keypad and the memory card reader 70 are then, for example, situated on either side of the motherboard 60. In other words, the memory card reader is positioned beneath the motherboard of the payment terminal. The payment terminal then preferably integrates other protection means (not shown) that are proper to it and enable the securing of the sides and the lower part of the memory card reader 70. This particular embodiment therefore removes the need for the protection cover 50 of FIG. 2. Such an implementation is particularly promising when a more compact implementation of the keypad and therefore of the payment terminal is desired.

The embodiment presented with reference to FIG. 3 also has other advantages as compared with the prior-art solutions described here above. As explained here above, in one application of a classic prior-art keypad, the motherboard of the electronic data-entry device can itself fulfill, among other functions, that of a printed-circuit board for the connection of the keypad. Dedicated zones on the motherboard are then reserved to receive the contact pairs used for the detection of key-press actions on the keys of the keypad, and to play a counter-pressure role relative to the deformable domes. It can be noted to this effect that, in the prior art, it is then the largest part of the domes, in this case their base, that take support on the motherboard of the electronic data-entry device. Each of these receiving zones must therefore be sized sufficiently to receive the base of a dome, including when this dome is in a deformed state (therefore a state potentially having a larger base than when it is not deformed). When such an implementation is envisaged in the prior art, it is also necessary to make provision, directly on the motherboard, for the electrical tracks that enable the conveying of the different signals generated on the keypad (especially the key-press detection signals). In addition to the already mentioned problems related to securing, it is therefore observed that such a prior-art solution dictates the need to reserve a great deal of space on the motherboard of the electronic data-entry device in order to implement a keypad alone. Such a space, if it were available, would enable the integration, into the motherboard, of novel functions, potentially more useful than the simple management of a keypad. The embodiment presented with reference to FIG. 3 does not have these drawbacks: it makes it possible not only to achieve a solution of equivalent compactness with a better level of securing, as already developed here above, but also to release space on the motherboard of the electronic data-entry device. Indeed, as can be seen in FIG. 3, the pairs of contacts 203 are disposed no longer on the motherboard 60 of the electronic data-entry device but on the connection flexible printed circuit 20 of the keypad. Besides, the dimensions of the counter-pressure zones—which must always be planned in relation to the domes 30 on the motherboard 60—are substantially reduced as compared with the dimensions of the prior-art counter-pressure zones. Indeed, with the mounting in inverted position implemented in the proposed technique, it is now the peaks of the domes 30—hence their narrowest part—and no longer their bases that rest on the motherboard 60. The embodiment presented with reference to FIG. 3 therefore enables a major gain in space on the motherboard of the electronic data-entry device when this solution is compared with those of the prior art.

According to a similar principle, FIG. 4 illustrates one embodiment enabling the recovery of even more space on the motherboard 60 while preserving a relatively compact keypad. In this particular embodiment, a spacing element 80 acts as a counter-pressure element for the deformable domes 30. This spacing element 80 is positioned between the peak of the domes 30 and the motherboard 60 of the electronic data-entry device. The spacing element 80 takes for example the shape of a rigid part comprising a substantially plane surface resting on supporting legs 801. The spacing element 80 is supported at different points on the motherboard 60 by means of the supporting legs 801. These supporting legs 801 are shaped and sized in such a way that they have a very small surface area of contact with the motherboard 60. In particular, the surface area of contact occupied by a supporting leg 801 on the motherboard 60 is less extensive than the surface area of the counter-pressure zone that must be planned on the motherboard 60 facing each dome, if we compare the embodiment of FIG. 4 with that of FIG. 3 for example. Besides, the supporting legs 801 have a finer section throughout their height as compared with a section of a dome that widens with distance from its peak. Finally, the number of supporting legs of the spacing element 80 can be smaller than the number of domes needed to implement the keypad. Through these characteristics of the supporting legs 801, the solution in which such a spacing element 80 is used as a counter-pressure element releases even more space on the motherboard 60 of the electronic data-entry device, especially when we compare it with the solution in which the motherboard 60 is directly used as a counter-pressure element. This released space can be profitably used to install other electrical tracks and/or other components on the motherboard 60 so as to propose new functions.

According to another aspect, the invention also relates to an electronic data-entry device comprising a keypad according to the above-described technique. It can especially be an electronic data-entry device used to perform operations that bring into play or relate to confidential objects such as an electronic payment terminal for example.

The invention claimed is:

1. A keypad for an electronic data-entry device, said keypad comprising:
   a plurality of keys defining a layer of keys;
   a connection printed-circuit board for said keypad, comprising a key-press detection portion, said key-press detection portion comprising an external face oriented towards said layer of keys and an internal face opposite said external face;
   for each key of said layer of keys, an interconnection element and at least one pair of contacts on said connection printed-circuit board, said interconnection element arranged to make electrical connection of the contacts of said pair of contacts when a pressure is exerted on the associated key of said keypad, said interconnection element comprising a deformable dome disposed between said internal face of the key-press detection portion and a counter-pressure element, a base of said deformable dome being oriented towards said internal face;
   wherein said connection printed-circuit board is a flexible printed-circuit board further comprising a connecting portion, said connecting portion forming a fold beneath the internal face of said key-press detection portion; and
   wherein said at least one pair of contacts is disposed on the internal face of said key-press detection portion.

2. The keypad according to claim 1, wherein said flexible printed-circuit board comprises at least one protective element, said at least one protective element extending substantially throughout a surface of said external face and/or throughout a surface of at least one layer of said flexible printed-circuit board positioned between said internal face and said external face.

3. The keypad according to claim 1, wherein the deformable dome is shaped and sized so that a pressure exerted on the associated key of said keypad leads to a local deformation of said flexible printed-circuit board on a surface area with a size of the order of four millimeters by four millimeters.

4. The keypad according to claim 1, wherein said counter-pressure element forms a protective cover to protect an element of said electronic data-entry device.

5. The keypad according to claim 1, wherein said counter-pressure element is a motherboard of the electronic data-entry device.

6. The keypad according to claim 1, wherein said counter-pressure element forms a spacing element that takes support, through substantially point-like links or line-like links, on a motherboard of the electronic data-entry device.

7. An electronic data-entry device comprising the keypad according to claim 1.

8. The electronic data-entry device according to claim 7, wherein said electronic data-entry device is an electronic payment terminal.

* * * * *